2,911,286

TREATMENT OF SAND

Charles Potter, South Orange, N.J., assignor, by mesne assignments, to Engelhard Industries, Inc., a corporation of New Jersey No Drawing. Application November 8, 1956
Serial No. 621,022

3 Claims. (Cl. 23—182)

This invention relates to a novel process for the treatment of silica sands, and to the improved sands produced thereby.

Silica sand is the principal ingredient in the manufacture of fused silica articles and in glassmaking, and sand may contain various contaminants including iron, calcium, magnesium, boron, alumina and titania, or these may be present in the form of various compounds thereof, for example, iron compounds occur in silica sands in many forms, and these compounds have the most detrimental effects upon the desired product. Iron impurities may be present in the form of discrete grains or specks of iron minerals, minerals containing iron, or minerals with iron compounds in solid solution, and stains consisting of iron oxide. Iron may be present as discrete grains of hematite, magnetite, limonite or pyrite; as iron containing minerals such as hornblende, biotite, ilmenite, and garnet, or it may be present in solid solution in such impurities such as muscovite, sericite, rutile and zircon. Iron may be present as a stain on the quartz grain or as part of a stain or as a stain on or in some impurity, such as the cracked or weathered feldspar of some western sands.

The degree of color removal in fused silica products and glassware is directly proportional to the removal of colored impurities such as iron compounds. These impurities may contaminate a user's products when a vessel prepared from fused silica, for example, is used to contain chemicals. Some industrial uses of fused silica containers are as trays to hold fluorescent powders during the baking thereof, and fused silica ware is also used in the manufacturing of pure silicon. These vessels are also used as muffles and chemical retorts. In the use of fused silica vessels in the chemical industry, they may be heated as high as 1400° C. and under high temperature conditions, impurities in the fused silica may retard the transmission of infra-red rays or conduct heat at different rates, thereby causing a point of local stress and promoting thermal stress and failure of the vessel. The impurities may also have different coefficients of expansion, subjecting the vessel to additional stresses.

In accordance with the present invention, silica sand is subjected to a cleaning operation which involves mixing the sand with a halogen-containing compound which, upon heating, decomposes to halogen or halogen acid and a compound which is non-reactive with silica. Compounds of this type preferably are fluorides or chlorides and the cationic portion of the compound preferably forms, upon decomposition, a volatile compound. Exemplary compounds of this type are ammonium halides, such as ammonium chloride.

In the manufacture of fused silica, according to the process of this invention, the halogen or halogen acid-liberating compound of the type previously described, such as ammonium chloride, is mixed with a high silica sand; the ammonium chloride may be added either in the dry form or as a solution. The halogen or halogen acid-liberating compound may be added in a concentration of about 0.1 to 5 percent by weight of the sand, or higher, but higher concentrations serve no useful purpose unless the sand is heavily contaminated.

The sand admixed with ammonium chloride may then be fused by any of the methods known to the art, i.e., in a stationary electric furnace, or in a centrifugal furnace provided with exterior heating, or in a centrifugal furnace in which the heat is supplied by an interiorly located electric arc, carbon rod or the like.

In the preparation of fused silica in a stationary electric furnace, the high silica sand admixed with ammonium chloride is poured in the annular space between a fused silica protective tube and a steel form, the entire assembly being mounted on the bottom electrode of an electric furnace. A carbon rod is positoned centrally of the protective tube and an upper electrode is connected to the carbon rod. Current is passed through the electrode and carbon rod, and the sand is fused to a predetermined thickness, after which the upper electrode is disconnected, and the carbon rod, or stick, is removed. A blow pipe, connected to a source of compressed air, is then inserted into the hot hollow billet of fused silica, and the billet is removed from the unfused sand. The hot billet is then placed in a suitable mold, and air pressure is applied to the interior of the billet, thereby forming the desired fused silica article, which is then removed from the mold and permitted to cool.

Apparently, during the fusing process the halogen-containing compound decomposes and forms volatile chemical compounds with the impurities in the silica, these volatile compounds being eliminated by distillation during the fusion process. Since the heat progresses from the center of the billet outwardly, there is a continuous progressive decomposition of the halogen-containing compound, flushing the silica grains, and distillation of the volatile compounds formed from the impurities.

The process of the invention may also be applied to the cleaning of sands used in glassmaking. For example, sand and a halogen-containing compound, such as ammonium chloride, may be mixed and passed through a rotary kiln or the like, at a temperature sufficient to decompose the ammonium chloride and distill the chlorides. This treatment removes impurities occluded on the surface of the sand grains or discrete particles of impurities interspersed throughout the sand. The sand as discharged from the rotary kiln, is in a highly purified state, ready for use in glassmaking operations.

The color of the fused silica products produced from sands treated in accordance with the present invention, is as good as or superior to fused silica products produced from chlorinated sand. The products produced by the process of this invention may be manufactured at a fraction of the cost of those made from chlorinated sands and using no more equipment than that ordinarily required for such fusion processes.

The invention will be further illustrated by reference to the following specific examples:

Example 1

To 25.0 pounds of heavily contaminated high silica sand, was added and mixed 0.025 pound of dry ammonium chloride. The sand used had not been properly washed and was contaminated with clay overburden. The mixture of sand and ammonium chloride was then placed in a stationary electric furnace, and current was applied (26 volts, 1600 amperes) for a period of 15 minutes. The hot hollow billet of fused silica was then removed from the furnace, placed in a mold and air pressure was applied, after which the fused silica product was allowed to cool. The color of this product was translucent and off-white and was much whiter by comparison than a similar product made from a similar sand which had not been mixed with ammonium chloride prior to fusion.

The product prepared from the untreated sand had a dark gray cast, with pronounced brown and black specks throughout.

*Example II*

To 200 pounds of a regular high silica sand is added 0.2 pound by weight of ammonium chloride, and the latter is thoroughly mixed with the sand. The mixture is then placed in an electric furnace and current is applied (40 volts, 1700 amperes) for one hour. A fused silica product is obtained having excellent whiteness and which is much whiter than a product produced from similar sand which as not treated with ammonium chloride.

In addition to the foregoing advantages of the process of the present invention, the process of the invention permits a uniform run of products, i.e., fused silica products produced by the process having uniform good whiteness, whereas heretofore some products would have good whiteness, but there was no way of maintaining uniform whiteness unless expensive chlorinated sands were used. The process of the present invention, however, produces products which are more attractive in appearance and more desirable from a utilitarian standpoint.

It will be obvious to those skilled in the art that many modifications may be made within the scope of the present invention without departing from the spirit thereof and the invention includes all such modifications.

What I claim is:

1. A process for producing fused silica which comprises mixing an impure silica sand with a halogen-containing compound which, upon heating, decomposes to a volatile compound which is non-reactive with silica and a member selected from the group consisting of halogen and halogen acid, and then heating the mixture to a temperature sufficient to volatilize impurities and fuse the silica into a coherent mass.

2. A process according to claim 1 in which the compound is an ammonium halide.

3. A process according to claim 1 in which the compound is ammonium chloride.

References Cited in the file of this patent

UNITED STATES PATENTS

| | | |
|---|---|---|
| 1,368,396 | Hulett | Feb. 15, 1921 |
| 2,093,106 | Ayers | Sept. 14, 1937 |
| 2,233,155 | Adams | Feb. 25, 1941 |

OTHER REFERENCES

Mellor: "Comprehensive Treatise on Inorganic and Theoretical Chemistry," vol. 6, pages 288–289.